United States Patent
Guerin et al.

(10) Patent No.: US 9,254,937 B2
(45) Date of Patent: Feb. 9, 2016

(54) DEEP GRIP MECHANISM FOR BLOW MOLD AND RELATED METHODS AND BOTTLES

(71) Applicant: Graham Packaging Company, L.P., York, PA (US)

(72) Inventors: Stephen R. Guerin, Milford, NH (US); David R. Piccioli, Auburn, NH (US); Thomas E. Nahill, Amherst, NH (US); Keith J. Barker, Bedford, NH (US)

(73) Assignee: GRAHAM PACKAGING COMPANY, L.P., York, PA (US)

( * ) Notice: Subject to any disclaimer, the term of this patent is extended or adjusted under 35 U.S.C. 154(b) by 265 days.

(21) Appl. No.: 13/841,566

(22) Filed: Mar. 15, 2013

(65) Prior Publication Data

US 2014/0263160 A1 Sep. 18, 2014

(51) Int. Cl.
| | |
|---|---|
| *B29C 49/48* | (2006.01) |
| *B29C 49/42* | (2006.01) |
| *B65D 1/40* | (2006.01) |
| *B65D 23/10* | (2006.01) |
| *B29L 31/00* | (2006.01) |
| *B29L 31/46* | (2006.01) |

(52) U.S. Cl.
CPC .............. *B65D 1/40* (2013.01); *B29C 49/4802* (2013.01); *B65D 23/102* (2013.01); *B29C 49/4236* (2013.01); *B29C 2049/4807* (2013.01); *B29C 2049/4892* (2013.01); *B29L 2031/463* (2013.01); *B29L 2031/7158* (2013.01)

(58) Field of Classification Search
CPC ................... B29C 49/4802; B29C 2049/4807; B29C 49/4236
USPC .............................. 425/525, DIG. 5; 264/531
See application file for complete search history.

(56) References Cited

U.S. PATENT DOCUMENTS

| | | | |
|---|---|---|---|
| 3,218,669 | A | 11/1965 | Barker |
| 3,457,590 | A | 7/1969 | Dittmann |
| 3,928,522 | A | 12/1975 | Farrell |
| 5,817,348 | A | 10/1998 | Ikeda |
| 6,447,281 | B1 | 9/2002 | Petre |
| 6,615,472 | B2 | 9/2003 | Petre |
| 2001/0051192 | A1 | 12/2001 | Petre |

(Continued)

FOREIGN PATENT DOCUMENTS

| | | | |
|---|---|---|---|
| DE | 1176829 B | * | 8/1964 |
| DE | 102008038781 A1 | * | 2/2010 |
| EP | 0 346 518 | | 12/1989 |

OTHER PUBLICATIONS

Partial machine translation of DE 102008038781 A1 dated Feb. 2010 obtained from the espace website.*

(Continued)

*Primary Examiner* — Robert B Davis
(74) *Attorney, Agent, or Firm* — Baker Botts L.L.P.

(57) ABSTRACT

Disclosed is a mold for forming a deep grip container, the mold having drive mechanisms opposably to drive moveable inserts into the mold. The drive mechanisms may be located entirely within the mold and may include a slotted cam. Also disclosed is a method of manufacturing a blow molded bottle with a deep pinch grip comprising: providing a mold hanger having an outer envelope and providing within the outer envelope a drive mechanism to drive moveable inserts into the mold after blowing molten plastic into contact with the mold. Further disclosed is a blow molded bottle with a deep pinch grip manufactured according to the disclosed methods.

18 Claims, 10 Drawing Sheets

(56) References Cited

U.S. PATENT DOCUMENTS

| | | |
|---|---|---|
| 2007/0145646 A1 | 6/2007 | Cho |
| 2009/0139996 A1 | 6/2009 | Jacson et al. |
| 2009/0236776 A1 | 9/2009 | Connolly et al. |
| 2011/0024952 A1 | 2/2011 | Stoiber et al. |
| 2011/0057361 A1 | 3/2011 | Gerlach et al. |
| 2011/0298162 A1 | 12/2011 | Chomel et al. |

OTHER PUBLICATIONS

U.S. Appl. No. 13/841,745, filed Mar. 15, 2013.

U.S. Appl. No. 13/841,745, May 21, 2014 Restriction Requirement.

International Search Report and Written Opinion for PCT/US2014/014783, dated May 23, 2014.

Sidel. SBO DC 16/SBO 18/SBO (Series 2) Machine Description Manual; Mar. 1, 2000 [retrieved on May 7, 2014] Retrieved from Internet: URL:http://www.go-dove.com/auctions/Auction16623/Sidel.pdf.

International Search Report and Written Opinion for PCT/US2014/017581, dated Jun. 10, 2014.

U.S. Appl. No. 13/841,745, Sep. 15, 2014 Non-Final Office Action.

* cited by examiner

FIG. 1

PRIOR ART

FIG. 13

DEEP GRIP MECHANISM FOR BLOW MOLD AND RELATED METHODS AND BOTTLES

The present invention relates generally to blow molding containers, and more particularly to using moveable inserts to mold a deep-grip bottle, for example.

Figure 1:
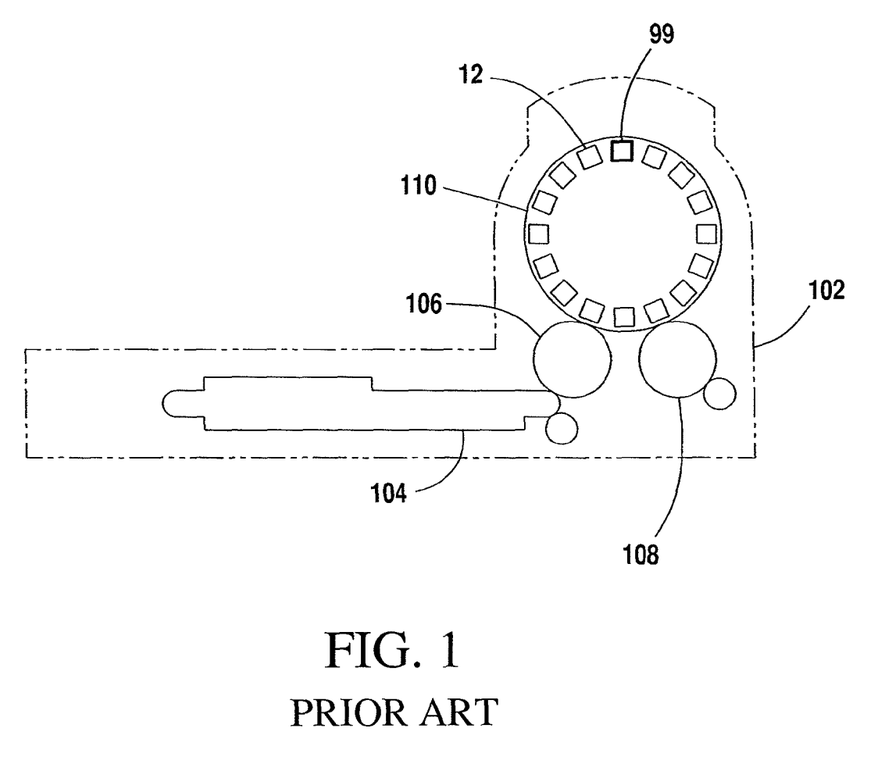
FIG. 1 is a diagram of a prior art arrangement for blow molding containers.

A prior art arrangement 102 for blow molding containers is shown in FIG. 1. A rotatable blow molding module 110 may have sixteen blow molding stations 12, for example. This may be a known Sidel-type SBO-16 GUPM module. The arrangement may include heating module 104, transfer module 106, and transfer module 108. The horizontal dimensions of a given blow molding module 12 define a space envelope 99.

Figure 12:
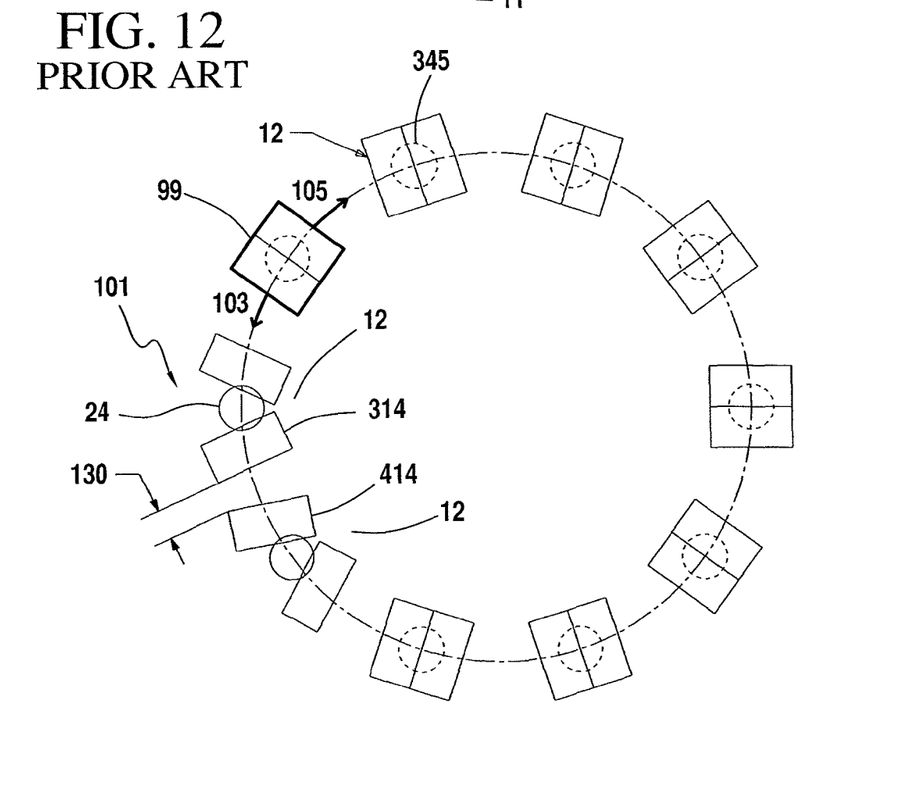
FIG. 12 is a diagram of a prior art module with blow molding stations for blow molding containers.

In another prior art arrangement shown in FIG. 12, a rotatable blow molding module may have ten blow molding stations 12. This may be a known Sidel-type SBO-10 GUPM module.

Figure 2:
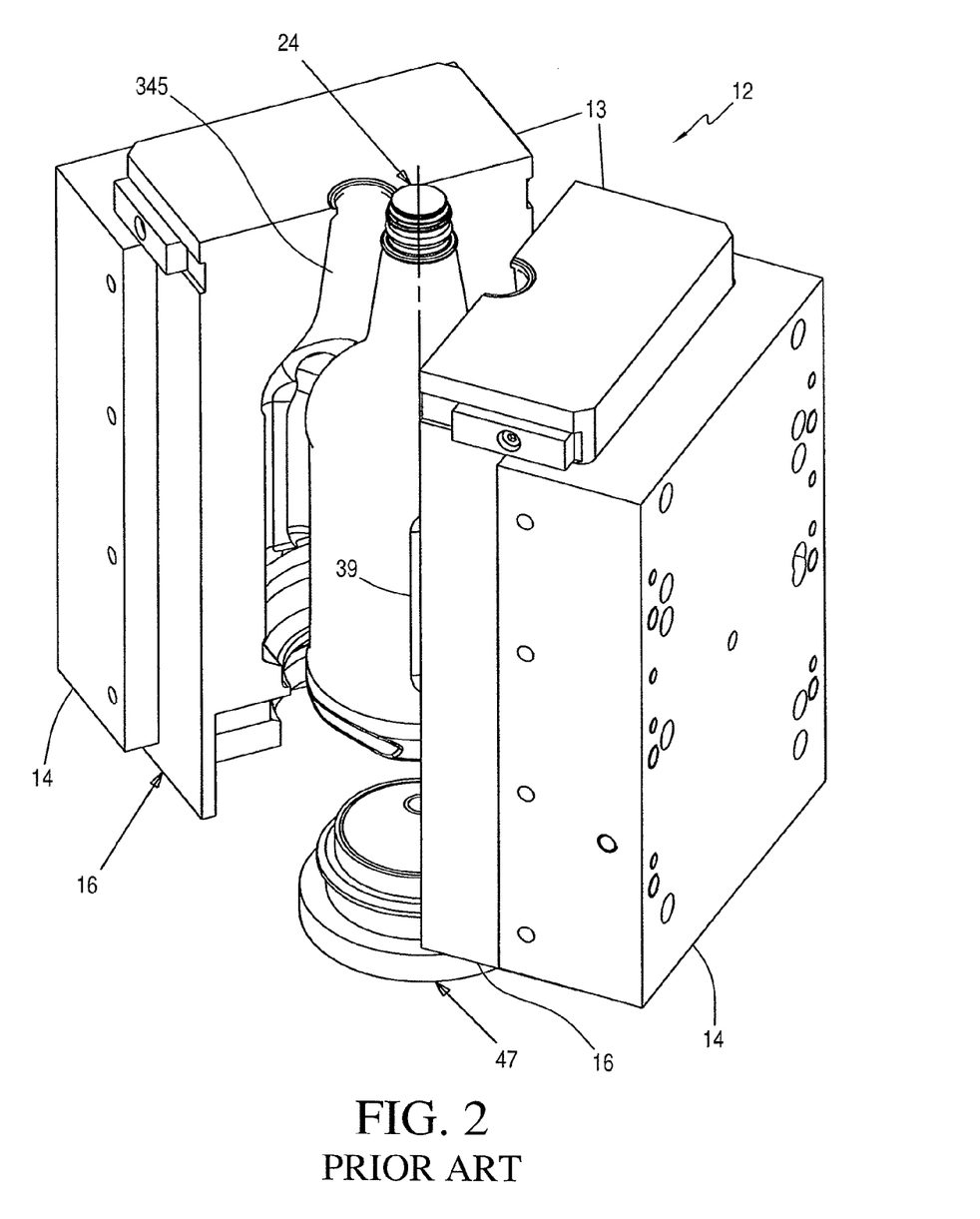
FIG. 2 is a perspective view of part of a prior art blow molding station.

In the prior art arrangements, each blow molding station 12 may include a mold 16 supported by a mold hanger 14, as depicted in FIG. 2. The mold may include cavity 345 for forming bottle 24 with grip 39. The blow molding station 12 may open in two halves 13. The mold may have a bottom 47 that needs to move downward to release bottle 24 at exit station 101 depicted in FIG. 12.

DETAILED DESCRIPTION

Under a cooperative research and development agreement, it has been suggested to the present inventors to provide moveable inserts or slides in a mold to provide a grip deeper than the grip 39 provided by the conventional arrangement shown in FIG. 2. The moveable inserts would move into the mold toward the end of the blowing process, but while the plastic was still malleable. The inventors have recognized that providing for moveable inserts in a low profile manner will permit the moveable inserts to be used in a conventional rotatable blow molding module where space is limited. This preserves a favorable production rate and efficiency of existing arrangements, such as the ten station rotatable blow molding module depicted in FIG. 12 and the sixteen station rotatable blow molding module 110 depicted in FIG. 1. Providing and actuating moveable inserts in the low profile manner as described herein obviates the need to use fewer stations on a given rotatable blow molding module or the need to increase the size of the rotatable blow molding module which would otherwise be necessary if lateral space envelope 99 of each blow molding station were significantly enlarged.

In a conventional ten station rotatable blow molding module as depicted in FIG. 12, finished bottle 24 is ejected at an ejection station 101 having a certain clearance 130 between an open mold hanger 314 in one existing blow molding station 12 and an open mold hanger 414 in an identical adjacent existing blow molding station 12. The outer envelope 99 of each mold hanger 314 and 414 of each existing blow molding station 12 cannot be increased by more than the clearance distance 130. In other words, the increase in lateral direction 103 and the increase in lateral direction 105 cannot together total more than clearance distance 130. Otherwise, mold hangers 314 and 414 would collide when they are opened at the ejection station. Preferably, the total increase of outer envelope 99 is significantly less than clearance distance 130. This allows for clearance distance 130 to be at least as large as a desired safety margin allowing for machining tolerances, positioning tolerances, hoses possibly getting positioned between adjacent hangers, and other safety considerations.

For a typical Sidel-type ten station rotatable blow molding module, e.g. Sidel SBO-10 GUPM, clearance 130 may be 66 millimeters. In that case, the desired safety margin may be 25 millimeters, permitting the total increase of outer envelope to be equal to, or preferably less than, 41 millimeters. All of the various inventive mechanisms described herein can easily be installed in each blow molding station while adding no more than 26 millimeters to the outer envelope 99. With further refinements, such as for example using stronger (and therefore thinner) metal in the mold hanger, the inventive drive mechanisms described herein may be added to an existing blow molding station 12 without causing the improved blow molding station to extend laterally beyond outer envelope 99.

Use of moveable inserts at various stages of a blow molding process is depicted in FIGS. 5 through 9.

Figure 5:
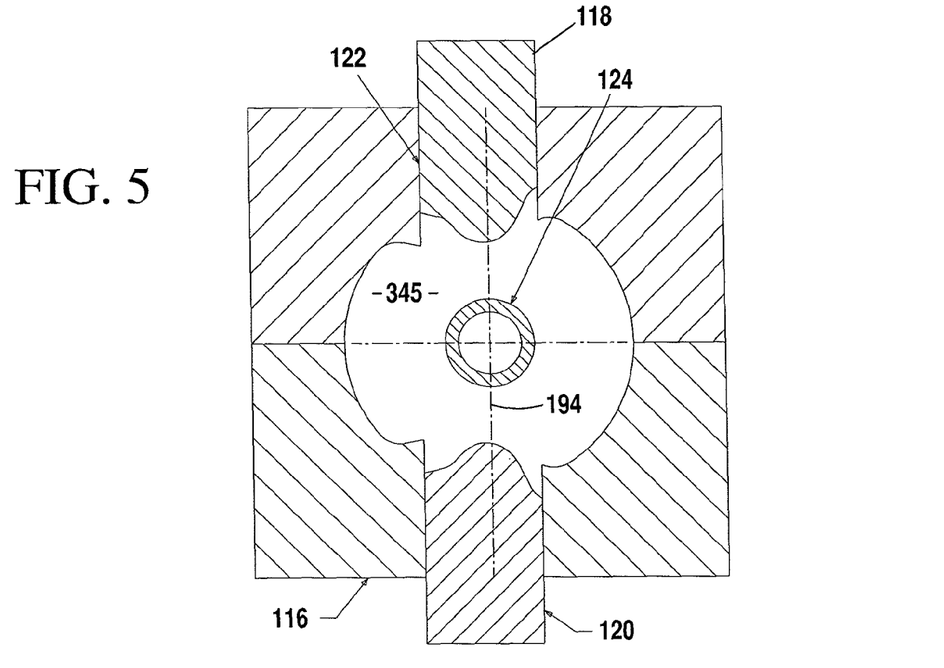
FIG. 5 is a cross-sectional view of an inventive mold with moveable inserts at a first stage.

FIG. 5 is a cross-section of a mold at a first stage. Here, preform 124 is shown centered on axis 194 of cavity 345 in mold 116. Moveable inserts 118 and 120 are shown in their outward or fully retracted position. Moveable insert 118 is slideably engaged in moveable insert pocket 122.

Figure 6:
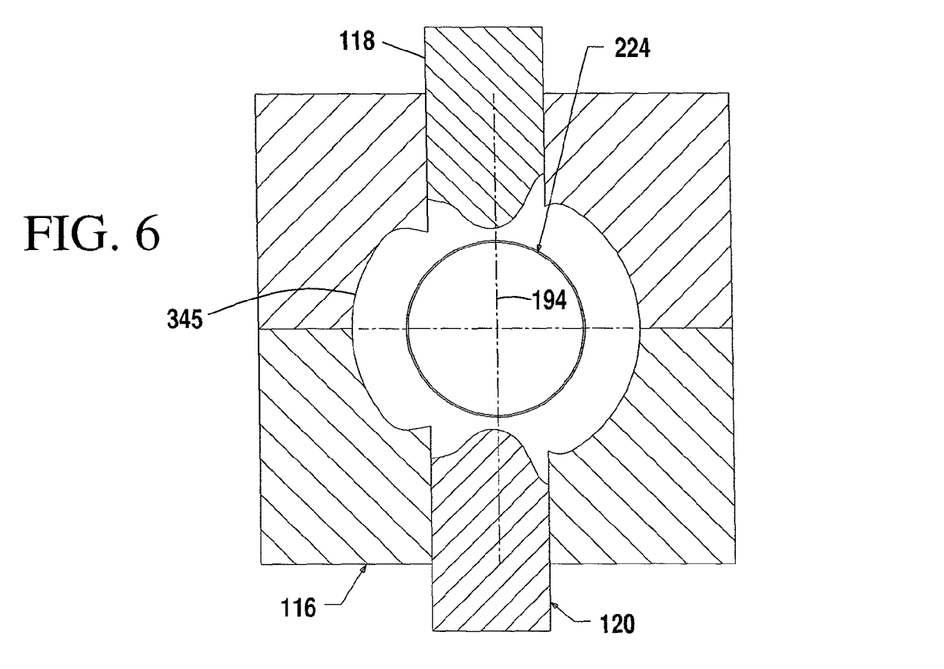
FIG. 6 is a cross-sectional view of the mold of FIG. 5 shown at a second stage.
Figure 7:
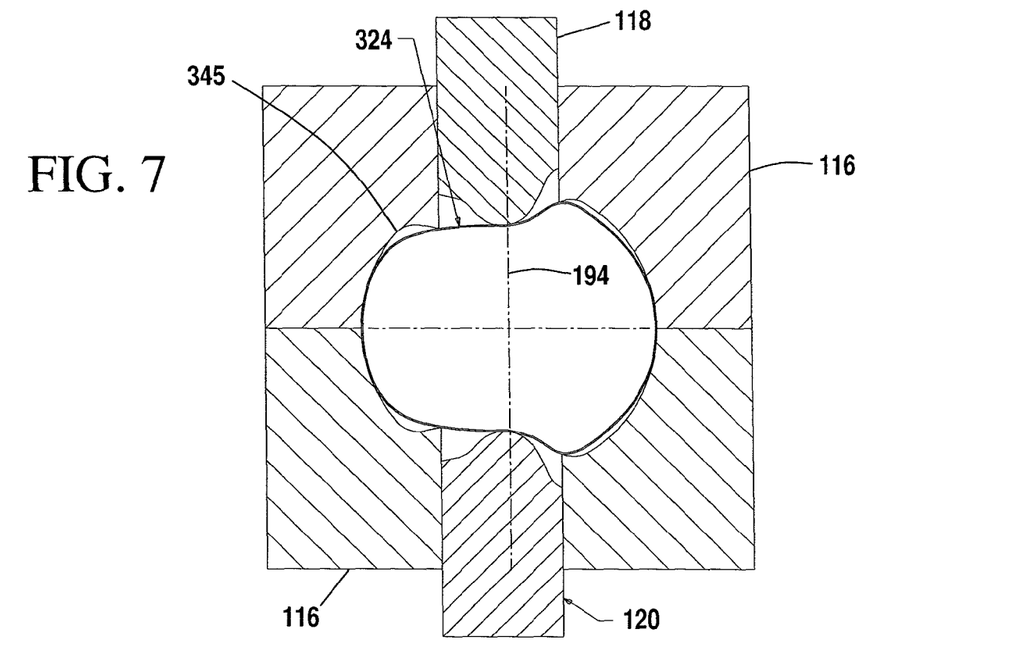
FIG. 7 is a cross-sectional view of the mold of FIG. 5 shown at a third stage.

FIG. 6 is a cross-sectional view of the mold of FIG. 5 shown at a second stage. By this time, preform 124 has been blown somewhat outward to intermediate form 224.
Moveable Ins FIG. 7 is a cross-sectional view of the mold of FIG. 5 shown at a third stage. By this time, intermediate form 224 has expanded to pre-shape 324 in partial contact with cavity 345.

Figure 8:
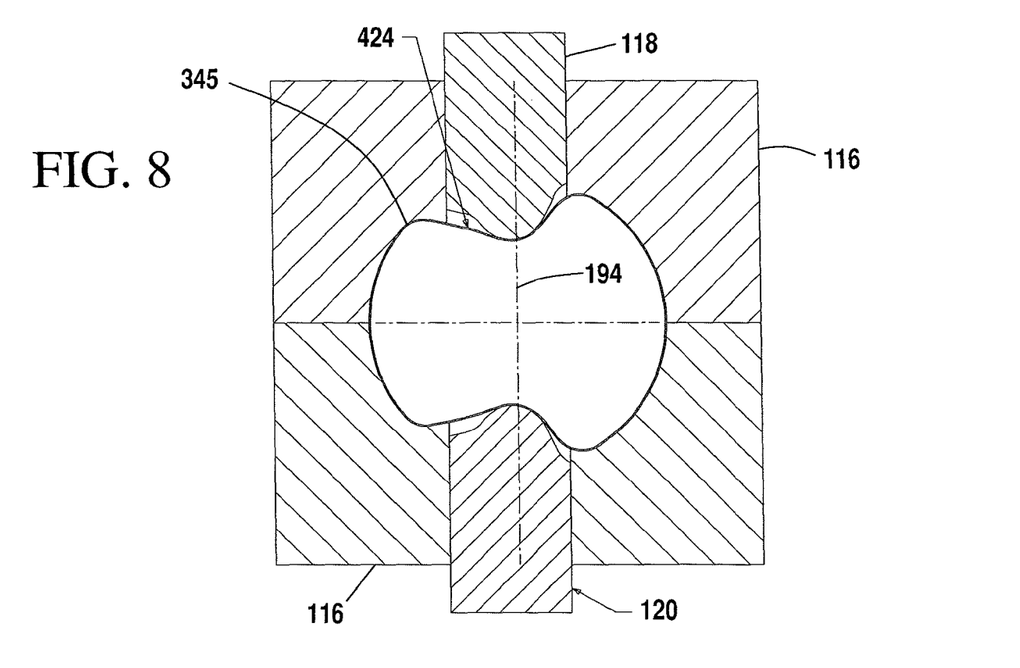
FIG. 8 is a cross-sectional view of the mold of FIG. 5 shown at a fourth stage.

FIG. 8 is a cross-sectional view of the mold of FIG. 5 shown at a fourth stage. By this time, pre-shape 324 has expanded to initial shape 424 in substantially full contact with cavity 345. Such contact may cause initial shape 424 to start cooling and hardening slightly.

Figure 9:
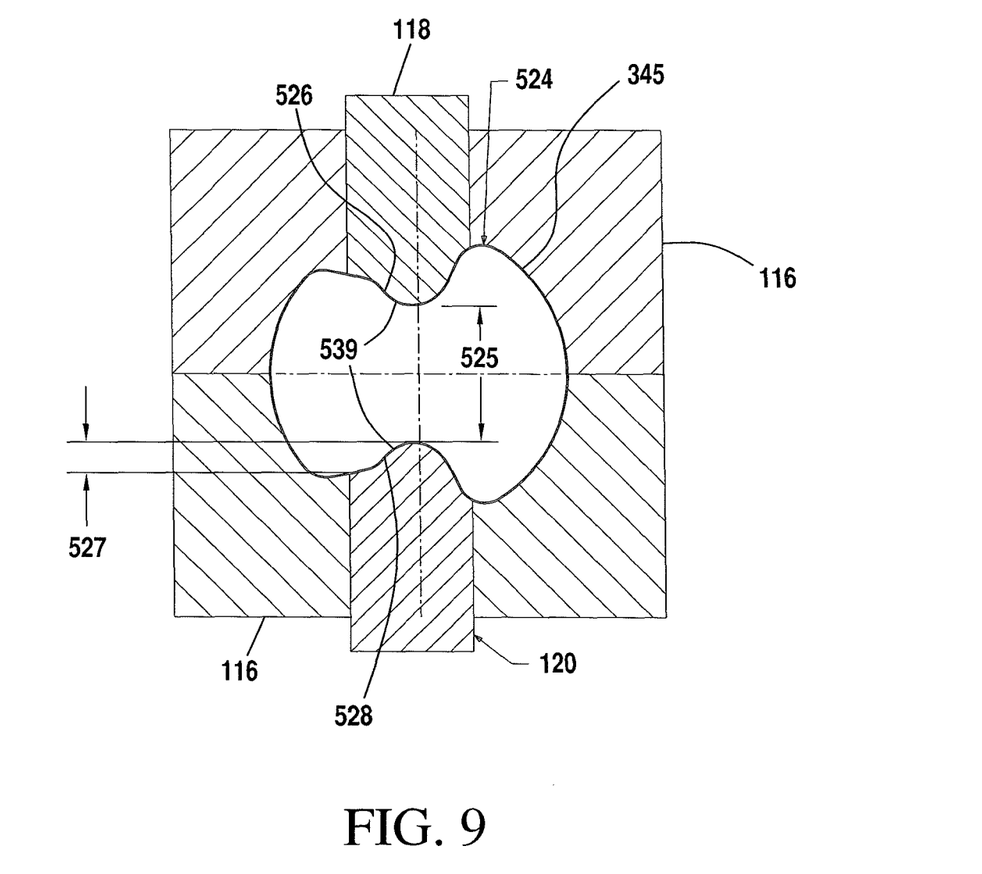
FIG. 9 is a cross-sectional view of the mold of FIG. 5 shown at a fifth stage.

FIG. 9 is a cross-sectional view of the mold of FIG. 5 shown at a fifth stage. Shortly after the stage shown in FIG. 8, moveable inserts 118 and 120 will advance into cavity 345 before initial shape 424 significantly hardens. Moveable inserts 118 and 120 are shown in FIG. 9 having moved to their inward or fully engaged position. The movement of moveable inserts 118 form their outward position to their inward position while the plastic is still molten moves the shallow grip in initial shape 424 into a deep pinch grip 539 to form deep pinch grip bottle 524.

Deep pinch grip 539 has a width 525 smaller than a width that would be possible in these circumstances without moveable inserts. It is difficult and costly to attempt to blow mold such a deep pinch grip bottle without using slides. Deep pinch grip 539 provides larger ledges 526 and 526 to rest on fingers and a thumb of a user. For example, ledges 526 and 528 may each have a depth indicated at dimension 527. Dimension 527 may be at least 29 millimeters, providing a secure ledge for pinch grip 539. Use of the moveable inserts can increase the depth of the ledges from 16 millimeters to 29 millimeters and decrease the width 525 of the grip from 3 and ⅛ inch to 2 and ⅛ inch in a 1.75 liter bottle, for example. This is especially beneficial in a large heavy bottle, such as a 1.75 liter liquor bottle. Deep pinch grip 539 provides stability in an energy- and plastic-efficient design.

The inventors have devised several ways of adding moveable inserts to a blow molding station in a manner having a profile low enough to permit use of an otherwise standard blow molding module. In one embodiment, the moveable inserts are moved by a low-profile piston preferably contained in a mold hanger. In another embodiment, the moveable inserts are moved by a low-profile cam preferably contained in a mold. A low-profile piston and a low-profile cam are both means for driving moveable inserts.

Figure 3:
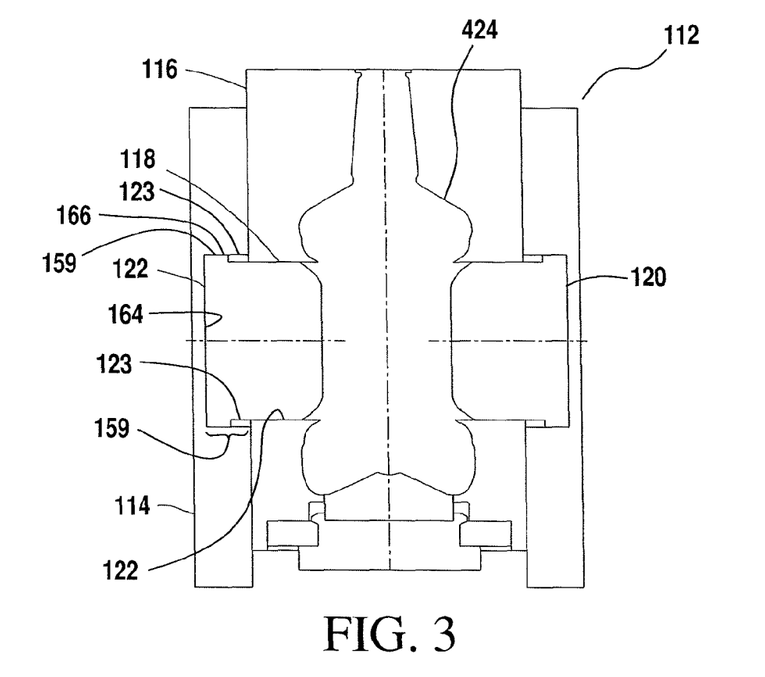
FIG. 3 is a front view of part of an inventive blow molding station at an early stage of operation.

FIG. 3 is a front view of part of an inventive blow molding station 112 with mold hanger 114 and mold 116, at an early stage of operation. Initial shape 424 is still molten and moveable inserts 118 and 120 are just about to start travelling inward from the outward position shown in FIG. 3. Piston 166 is provided in piston sleeve 159. In this figure, piston top 165 of piston 166 is adjacent piston sleeve head end 164. Piston 166 is ready to start pushing moveable insert 118 inward through insert pocket 122, by piston 166 advancing in piston sleeve 159 into annular space 123.

Figure 4:
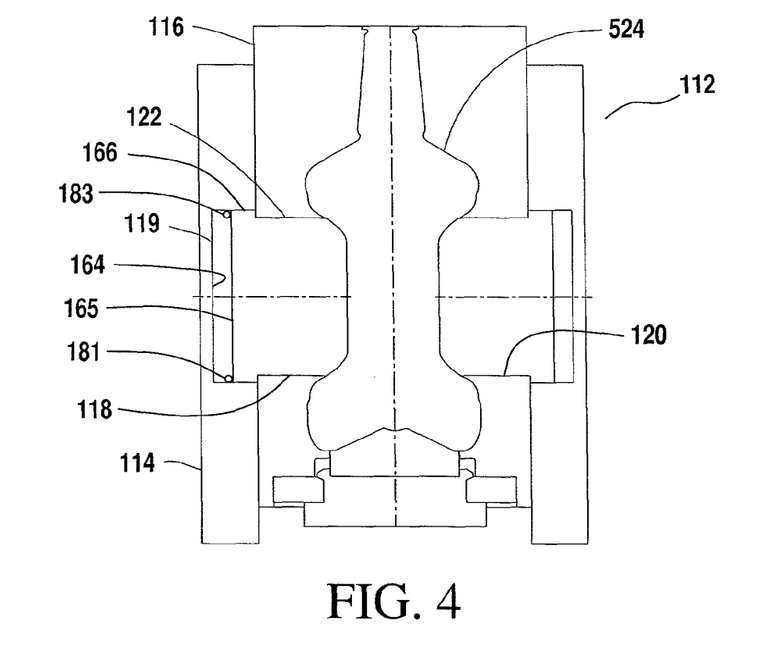
FIG. 4 is a front view of the part of an inventive blow molding station from FIG. 3, shown at a later stage.

FIG. 4 is a front view of the part of an inventive blow molding station from FIG. 3, shown at a later stage. Initial shape 424 has been pushed inward by inserts 118 and 120, to form bottle 524. The movement of piston 166 has filled annular space 123 and vacated annular space 119. That motion has pushed inserts 118 through insert pocket 122.

At the stage shown in FIG. 4, piston top 165 has advanced beyond optional latches 181 and 183. Latches 181 and 183 may be moved from outside piston sleeve 159 to protrude into annular space 119 by fluid pressure or spring force, for example. By thus protruding, latches 181 and 183 resist movement of piston 166 in the outward direction. Such engagement of latches 181 and 183 can ensure moveable insert 118 stays in place in its inward position even if air pressure blowing outward from center line 193 applies outward pressure to moveable insert 118. Latches 181 and 183 may remain engaged until bottle 524 has hardened sufficiently to move piston 166 back to its outward position where piston top 165 is adjacent piston sleeve head end 164. At that time, latches 181 and 183 may be disengaged by application or release of spring or fluid pressure, for example.

Figure 10:
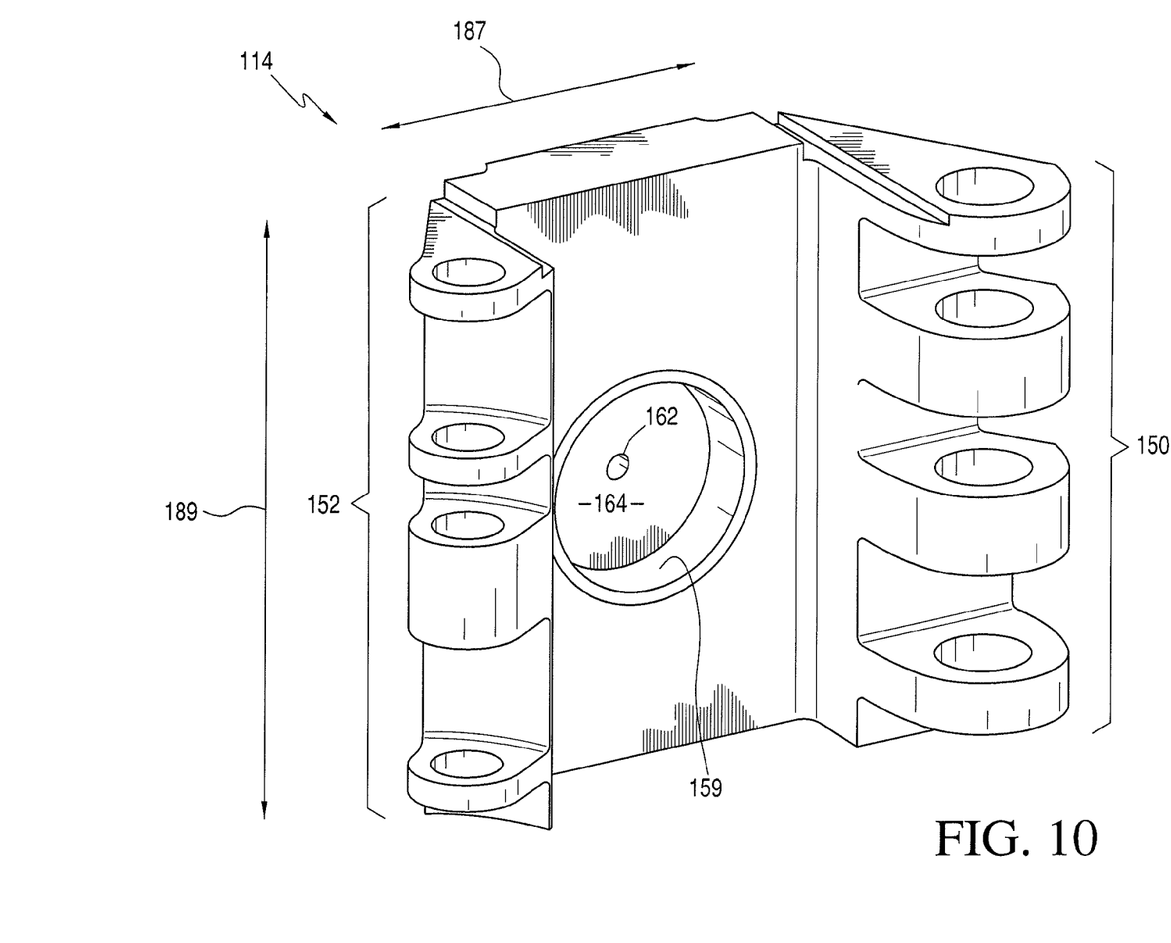
FIG. 10 is a perspective view of an inventive mold hanger.

FIG. 10 is a perspective view of an inventive mold hanger. Piston sleeve 159 meets piston sleeve head end 164 in mold hanger 114. Piston sleeve head end 164 has first source of fluid pressure 162 centered therein. Mold hanger 114 has hinge 150 to be rotatably secured to the back of blow molding station 112 and clasp 152 to close the front of blow molding station 112 during blow molding. Mold hanger 114 may be characterized by vertical direction 189 and horizontal direction 187.

Figure 11:
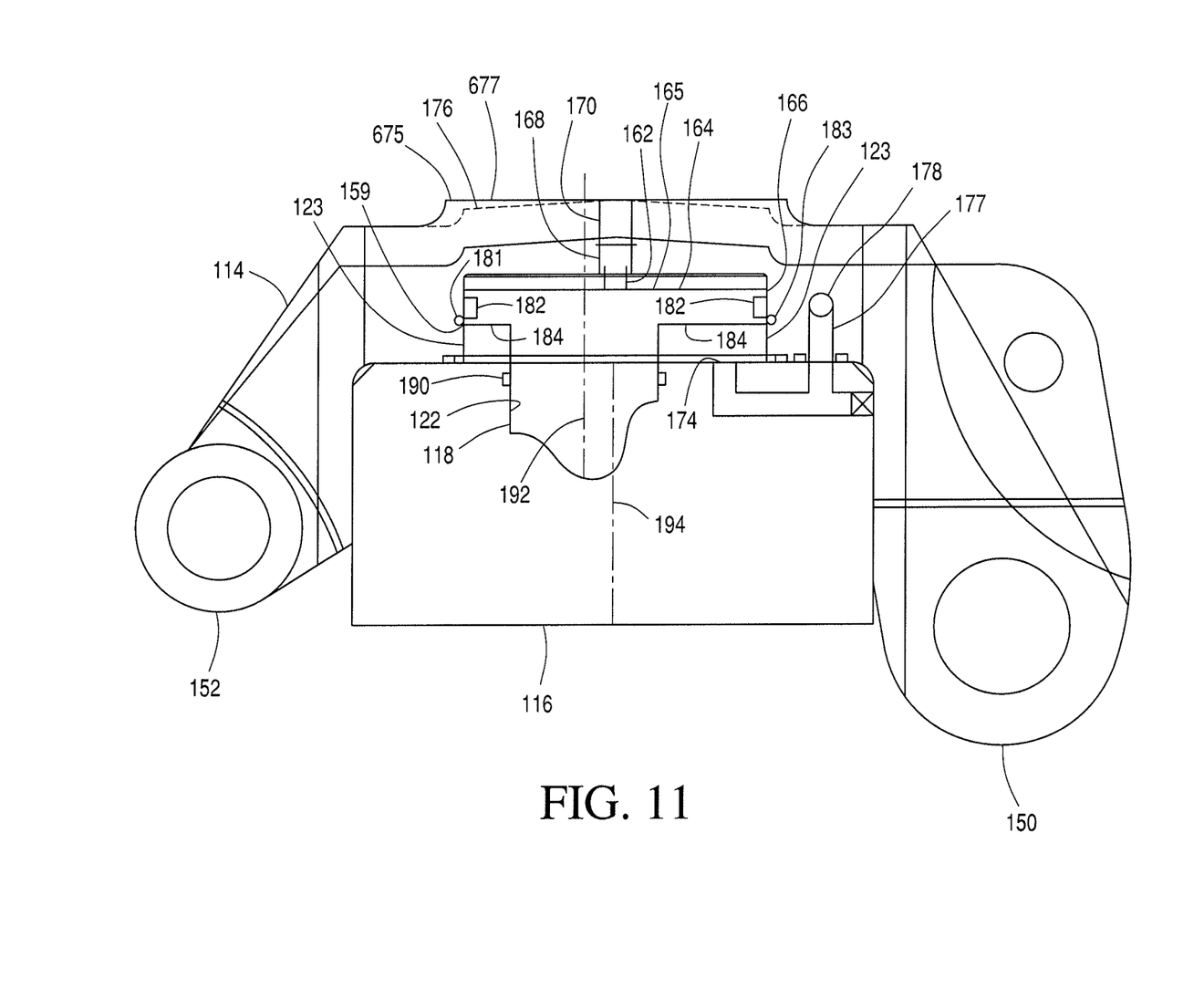
FIG. 11 is a top down view of an inventive mold hanger, piston, and mold.

FIG. 11 is a top down view of an inventive mold hanger, piston, and mold. Piston 166 rides in piston sleeve 122, secured by annular seal 182. Piston 166 drives moveable insert 118 in insert picket 122, guided by guides 190 cooperating with bushings (not shown). Duct 170 may have a female pipe thread and brings fluid pressure through high pressure fluid inlet hole 168 to first source of fluid pressure 162. Duct 170 preferably travels down within hanger 114 to obtain fluid pressure from the bottom of blow molding station 112. Alternately, duct 170 may connect to a feed hose supplying fluid pressure. Fluid pressure form first source of fluid pressure 162 presses against piston top 165 to urge piston 166 inwardly in piston sleeve 159 which in turn pushes moveable insert 118 inwardly in moveable insert pocket 122. The fluid in moveable insert pocket 122 may be exhausted to feed hole 178 via passage 177 in mold hanger 114. Feed hole 178 is preferably a low pressure air return line which originates at the bottom of mold hanger 114.

Once piston 166 and moveable insert 118 are in their inward position, they form deep pinch grip 539 as previously described. When deep pinch grip bottle 524 is sufficiently hardened, moveable insert 118 can be moved in back to its outward position, forcing piston top 165 out to its outward position adjacent piston sleeve head end 164. This backward movement can be accomplished by applying fluid pressure against the bottom 184 of piston 166, such as by introducing fluid pressure from second source of fluid pressure 174 supplied by duct 187 through passage 177.

In FIG. 11, optional latches 181 and 183 are shown in their disengaged position.

FIG. 12 is a diagram of a prior art module with blow molding stations for blow molding containers.

Figure 13:
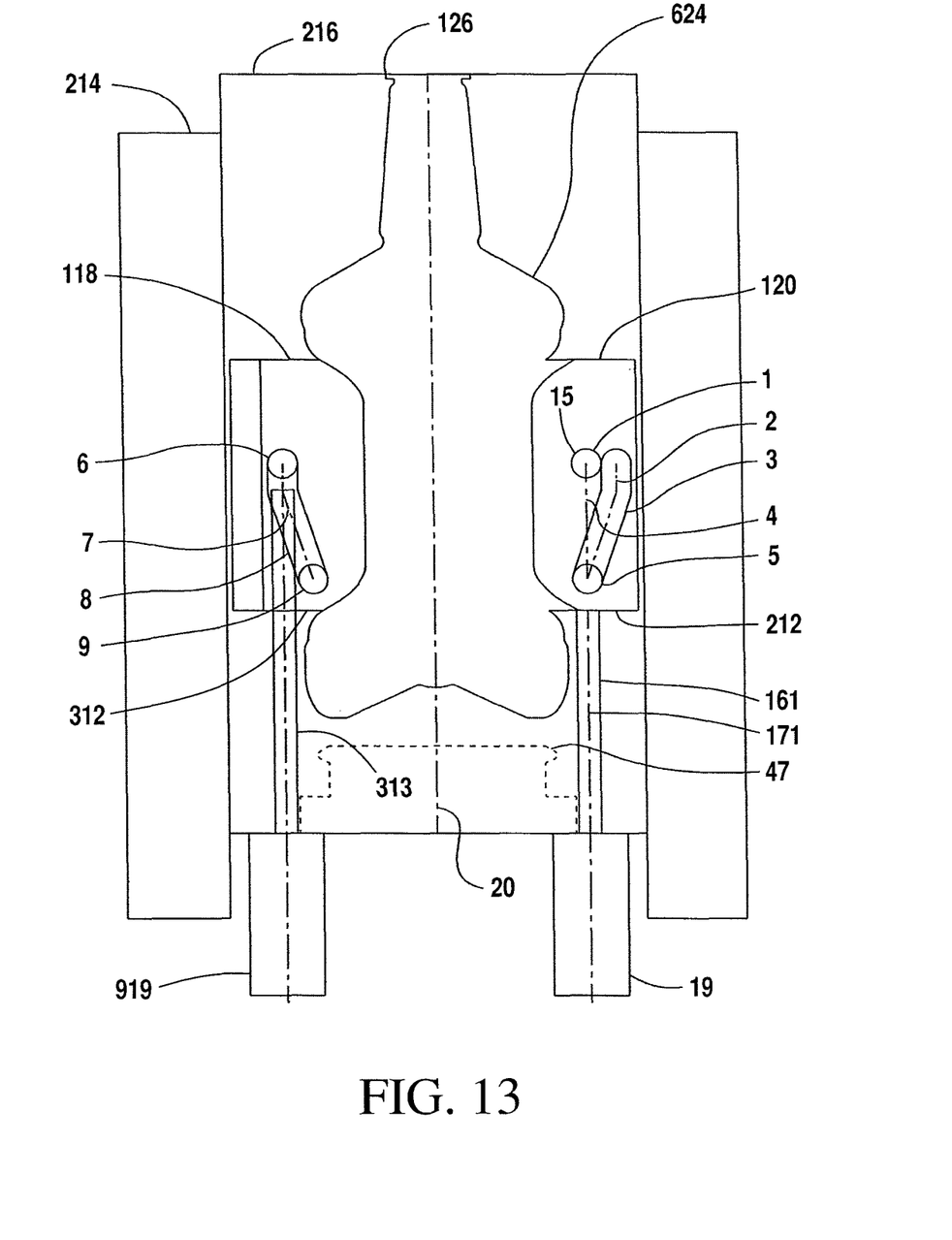
FIG. 13 is a composite front view of an inventive blow molding station shown at two different times.

FIG. 13 is a composite front view of an inventive blow molding station shown at two different times. Mold 216 is secured by mold hanger 214 and contains moveable insert 118. Moveable insert 118 is completely contained within mold 216. As shown in the right half of FIG. 13, moveable insert 120 is in its outward position. Fluid actuation cylinder 19 is prepared to push cylinder 161 up through path 171 to force cam follower 15 from position 5 to position 1 along path 4. Because the groove 3 cam follower 15 rides in is angled outwardly and upwardly, the force of cam follower 15 being forced from position 5 to position 1 pushes moveable insert 120 inwardly under the force of the inclined plane along dogleg path 2.

The inward position is shown at a later time in the left half of FIG. 13. There, the cam follower is in the up position 6, holding moveable insert 118 in its inward position to form a deep grip pinch in bottle 624. When bottle 624 is sufficiently cooled and hardened in mold cavity 126, moveable insert 118 can be moved to the outward position by fluid actuation cylinder 919 operating in reverse. That is, fluid actuation cylinder 919 pulls the cam follower from position 6 to position 9 along dogleg path 7 in groove 8. Because groove 8 is angled downwardly and inwardly, pulling the cam follower down from position 6 to position 9 applies an inclined plane force pulling moveable insert 118 outward away from bottle 624 and out of cavity 126.

Thus, drive mechanism 312 comprises a cam follower or roller in groove 8 and cylinder shaft 313, all contained in mold 216.

Figure 14:
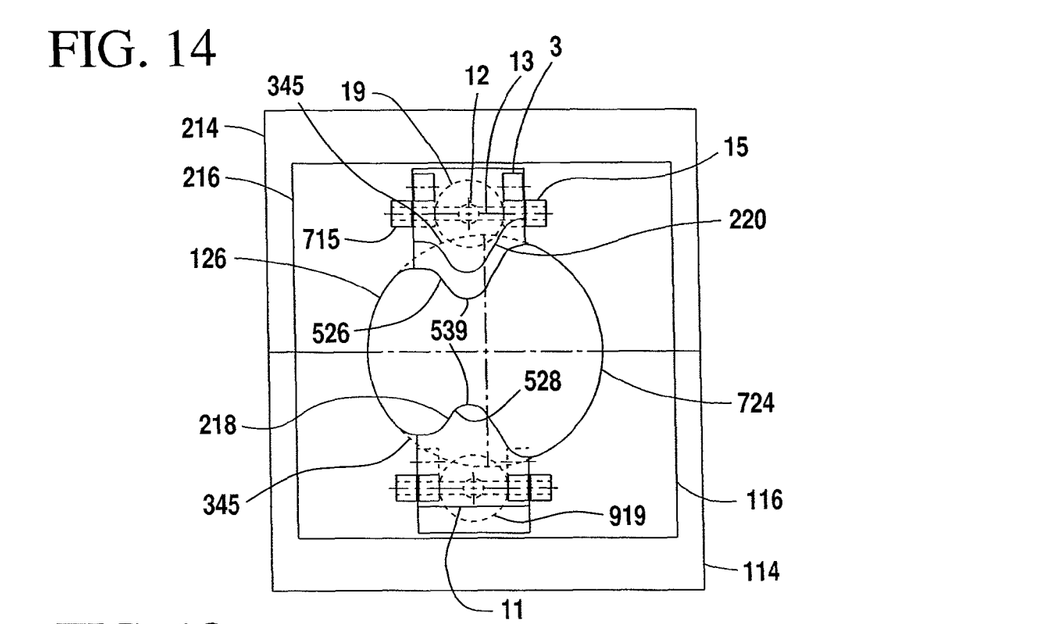
FIG. 14 is a top down plan of the composite view shown in FIG. 13.

FIG. 14 is a top down plan of the composite view shown in FIG. 13. In the bottom half, moveable element 218 is in the inward position. In the top half, moveable element is shown being retracted from the inward position shown in the bottom half, at a later time than that depicted in the bottom half. Cylinder linkage 12 is shown linking cylinder 161 with cam follower 15 via shaft 13 holding cam follower 15 and cam follower 715.

In one exemplary embodiment, the invention comprises a mold hanger 114 for supporting a bottle mold 116 in a blow molding station 112, the mold hanger 114 having a vertical direction 189 and a horizontal direction 187, the mold hanger 114 comprising a piston sleeve 159 fully contained within the mold hanger 114 and orthogonal to both the vertical direction 189 and the horizontal direction 187; a piston sleeve head end 164 capping the piston sleeve 159; a piston 166 slideably engaged with and fully contained within the piston sleeve 159, the piston 166 having a piston top 165 conforming to the size and shape of the piston sleeve head end 164 and a piston bottom 184; a moveable insert 118 integral with the piston bottom 184 and configured to be pushed by the piston bottom 184 in an inward direction away from the piston sleeve head end 164 into a mold 116 supported by the mold hanger 114; and a first source of fluid pressure 162 configured to apply pressure to the piston top 165 to push the piston 166 slideably away from the piston sleeve head end 164 and toward the mold 116; wherein the piston top 165 has an area larger than a cross sectional area of the moveable insert 118.

The mold hanger 114 may have a second source of fluid pressure 174 configured to apply pressure to the piston bottom 184 to push the piston 186 slideably toward the piston s The first source of fluid pressure 162 preferably provides pressurized air from a pressurized air source that is also used to blow mold a bottle 24 in the bottle mold. Alternatively, the first source of fluid pressure 162 may provide hydraulic pressure.

Preferably, fluid pressure from the first source of fluid pressure 162 is sufficient to hold piston 166 and moveable insert 118 in the inward position shown in FIGS. 3 and 9 against outward pressure from pressurized air used to mold the bottle. However, latches 181 and 183 may be provided to hold piston 166 and moveable insert 118 in that inward position. Latches 181 and 183 may contain springs and/or may be actuated by fluid pressure available in mold hanger 114.

A central axis 192 of piston 166 may be parallel to and laterally displaced from a central axis 194 of moveable insert 118. This lateral offset may provide room for second source of fluid pressure 174 to communicate with fluid passage 178 in mold hanger 114. The lateral offset may permit piston 166 to be centered along the horizontal direction 187 of mold hanger 114 while moveable insert 118 is off center to provide deep grip 539 offset from the center of the bottle which may be at axis 192.

Moveable insert 118 of mold hanger 114 may be configured to be pushed at least about one half inch into mold 116 supported by mold hanger 114. With such inserts in both halves of mold 116, deep grip 539 may be at least one inch deeper than without the insert. This may permit ledges 526 and 528 each to have a depth 527 of at least 29 millimeters instead of only about 16 millimeters without the moveable insert.

Piston sleeve 159 may be no more than one inch long in its axial direction along its axis 194. This length accommodates both the travel distance of piston 166 and the thickness of piston 166 itself. For example, if piston 166 is one half inch thick, piston 166 may travel one half inch within a one inch piston sleeve 159. If piston 166 were one quarter inch thick, piston 166 could travel three quarters of an inch within a one inch piston sleeve 159.

With the low profile of a once inch piston sleeve 159, mold hanger 114 may be no more than about two inches thick in the portion 675 surrounding piston sleeve 159. Mold hanger 114 may be no more than about one inch thick in the portion 677 beyond the piston sleeve head end 164. The thickness of mold hanger 114 could be reduced further by use of stronger metal, such as titanium. The thickness of a standard existing Sidel mold hanger is shown in FIG. 11 by phantom line 172. As can be seen, the added thickness at portion 675 and 677 is minimal.

In a second exemplary embodiment, there is provided a method of retrofitting an original rotatable blow molding module 110 having multiple existing blow molding stations 112 affixed to the rotatable blow molding module 110, each existing blow molding station 112 having an existing mold hanger 14 for supporting and encasing mold 16 for a bottle 24, each existing mold hanger 14 defining an existing outer envelope 99, the method comprising: providing in each blow molding station 112 an improved mold hanger, the improved mold hanger substantially contained within the respective existing outer envelope 99 and configured to support and encase a mold for blow molding a bottle 524 from plastic; and providing in each improved mold hanger a pair of low-profile drive mechanisms configured opposably to drive a respective pair of moveable inserts 118 and 120 at least one half inch into a cavity of the mold 116 while the plastic is molten.

The method may further comprise providing a fluid pressure source in fluid communication with the drive mechanisms. The fluid pressure source may provide pneumatic or hydraulic pressure and may include pressure duct 170, for example. The method may include redirecting fluid pressure pre-existing on each existing blow molding station 112. In that case, pressure duct 170 may receive pressure from the same source of pressure used to blow mold containers in the mold, for example.

Alternately the fluid pressure source used in the method may comprise or be in fluid communication with a low profile, high pressure, canister 19. The method may include securing low profile, high pressure, canister 19 in each blow molding station below the respective mold in fluid communication with the respective drive mechanisms.

In the method, providing an improved mold hanger may comprises replacing the existing mold hanger 14. Or it may comprise reusing the existing mold hanger in altered form.

The method may include providing a drive mechanism comprising a slotted cam or a piston, for example. In the case of a piston, the piston may have a cross-sectional area larger than a cross-sectional area of the moveable insert. In this manner, the cross-sectional surface area of the piston that is impacted by fluid pressure pushing the piston in toward the mold is greater than the cross-sectional area of moveable insert subject to outward pressure from the air pressure used to blow mold a bottle in the mold. This helps ensure that the force of the drive mechanism pushing the moveable insert into the mold is strong enough to overcome friction and outward pressure even if the fluid pressure used to blow mold the bottle is the same as or less than the fluid pressure used to drive the drive mechanism inward.

In the method, the drive mechanism may be configured to drive the moveable insert within an insert pocket in the mold.

The method may be used where the original rotatable blow molding module before the retrofitting has no more than about 66 millimeters clearance between respective existing blow molding stations in operation. The rotatable blow molding module may be a ten-station Sidel-type GUPM wheel, for example. Before the retrofitting, the original rotatable blow molding module may have no moveable mold inserts.

In the method the moveable insert may be configured to move at least about one half inch into an interior cavity inside the mold.

A third exemplary embodiment provides a method of manufacturing a blow molded bottle 524 with a deep pinch grip 539 comprising: providing a mold hanger defining an outer envelope; providing in the mold hanger a mold with a cavity 345 configured to receive molten plastic; providing within the outer envelope a first moveable insert 118; providing within the outer envelope a second moveable insert 120; providing within the mold hanger a first drive mechanism configured to drive the first moveable insert 118 in a first direction into the cavity 345; providing within the mold hanger a second drive mechanism configured to drive the second moveable insert 120 in a second direction into the cavity 345, the second direction being generally opposed to the first direction; blowing molten plastic into contact with the mold; and after blowing the molten plastic into contact with the mold, operating the first and second drive mechanisms to drive the first and second moveable inserts into the cavity 345 while the plastic is still pliable and form a blow-molded bottle 534 with a deep pinch grip 539.

The method may include operating the first and second drive mechanisms to drive the first moveable insert 118 at least about one half inch into the cavity 345 and to drive the second moveable insert 120 at least about one half inch into the cavity 345.

In this method, deep pinch grip 539 may have a first ledge 526 at least about 29 millimeters deep formed by the first moveable insert 118 and a second ledge at least about 29 millimeters deep formed by the second moveable insert 120, as depicted in FIG. 9. Deep pinch grip 539 may have a width 525 equal to or less than about 2 and ⅛ inches, for example.

The exemplary method of manufacturing a blow molded bottle 524 with a deep pinch grip 539 may further comprise operating the first and second drive mechanisms in reverse to move the first and second moveable inserts away from the blow-molded bottle.

A fourth exemplary embodiment is a blow molded bottle 524 with a deep pinch grip 539 manufactured according to a method described above in the third exemplary embodiment. Such a bottle may be, for example, a 1.75 liter bottle with a deep pinch grip 539 no more than about 2 and ⅛ inch wide (shown as dimension 525 in FIG. 9) and having a ledge 526 at least about 29 millimeters deep on a first side of the grip and a ledge 528 at least about 29 millimeters deep on a second side of the grip (shown as dimension 527 in FIG. 9).

In a fifth exemplary embodiment, the invention provides a mold with a cavity for forming a deep grip container, the mold comprising: a first mold pocket configured to receive a first moveable insert; a second mold pocket configured to receive a second moveable insert; a first drive mechanism fully contained within the mold and configured to drive the first moveable insert in a first direction through the first mold pocket into the cavity; and a second drive mechanism fully contained within the mold and configured to drive the second moveable insert in a second direction through the second mold pocket into the cavity, the second direction being generally opposed to the first direction.

The first drive mechanism may include a slotted cam. The mold may further comprise a cylinder shaft positioned in a cylinder shaft hole in the mold, the cylinder shaft in mechanical cooperation with the first drive mechanism. Such a mold may also have a linkage between the cylinder shaft and the first drive mechanism. It may further have an angled roller slot in the mold, angled upward and outward in relation to the cavity and a roller mounted to the linkage and adapted to roll in the roller slot. The angled roller slot may be a dog leg configuration with a straight portion of the slot located above an angled portion. The cylinder shaft can be configured to be operated by a fluid pressure cylinder mounted to a bottom surface of the mold. The fluid pressure cylinder may operate under hydraulic or pneumatic pressure.

In the mold of the fifth exemplary embodiment, the first drive mechanism may be configured to drive the first moveable insert in the first direction at least one half inch into the cavity and the second drive mechanism may be configured to drive the second moveable insert in the second direction at least one half inch into the cavity.

In a sixth exemplary embodiment, there is provided a method of retrofitting an existing blow molding station 12 having an existing mold hanger 14 for supporting and encasing a mold 16 for a bottle 24, the existing mold hanger defining an existing outer envelope 99. The method may comprise providing in the blow molding station an improved mold hanger, the improved mold hanger substantially contained within the existing outer envelope 99 defined by the existing mold hanger 14 and configured to support and encase a mold 116 for blow molding a bottle 524 from plastic; and providing in the improved mold hanger a pair of low-profile drive mechanisms configured to opposably drive a respective pair of moveable inserts 118 and 120 at least one half inch into a cavity 345 of the mold 116 while the plastic is molten.

This method may further include providing a fluid pressure source in fluid communication with the drive mechanisms. The fluid pressure source may be configured to provide hydraulic pressure or pneumatic pressure and, on one hand, may include fluid pressure pre-existing on and redirected from the existing blow molding station.

On the other hand, the fluid pressure source may be provided by a low profile, high pressure, canister. The canister may be secured below the mold in fluid communication with the drive mechanisms.

In the sixth exemplary embodiment, providing an improved mold hanger may include replacing the existing mold hanger, reusing the existing mold hanger in altered form, or reusing the existing mold hanger. Providing in the improved mold hanger a pair of low-profile drive mechanisms may include providing the drive mechanisms in a mold supported by the existing mold hanger.

In the method of retrofitting an existing blow molding station, the improved mold hanger laterally extends beyond the existing outer envelope by a cumulative total of less than the clearance distance 130, e.g. 66 millimeters. To include a safety margin, the improved mold hanger laterally extends beyond the existing outer envelope by a cumulative total of less than 41 millimeters. In the disclosed method, the improved mold hanger can easily be arranged to extends laterally beyond the existing outer envelope by a cumulative total of less than 26 millimeters. By making certain adjustments, the improved mold hanger will not extend laterally beyond the existing outer envelope 99 at all.

The drive mechanism in this method may be configured to drive the moveable insert within an insert pocket in the mold. The moveable insert may be configured to slide within the insert pocket at least about one half inch into an interior cavity inside the mold.

In this method the existing blow molding station 12 may be part of a ten-station Sidel-type GUPM wheel indicated in FIG. 12 or a sixteen-station Sidel-type GUPM wheel indicated in FIG. 1, for example.

In this exemplary method, the drive mechanism may comprise a slotted cam or a piston, for example. In the case of a piston, the top surface 165 of the piston may have a cross-sectional area larger than a cross-sectional area of the moveable insert.

In a seventh exemplary embodiment, there is provided a method of manufacturing a blow molded bottle with a deep pinch grip comprising: providing a mold hanger having an outer envelope; providing in the mold hanger a mold with a cavity configured to receive molten plastic; providing within the outer envelope a first pocket configured to receive a first moveable insert; providing within the outer envelope a second pocket configured to receive a second moveable insert; providing within the outer envelope a first drive mechanism configured to drive the first moveable insert in a first direction through the first pocket into the cavity; providing within the outer envelope a second drive mechanism configured to drive the second moveable insert in a second direction through the second mold pocket into the cavity, the second direction being generally opposed to the first direction; blowing molten plastic into contact with the mold; and after blowing the molten plastic into contact with the mold, operating the first and second drive mechanisms to drive the first and second moveable inserts into the cavity while the plastic is still pliable and form a blow-molded bottle with a deep pinch grip.

This exemplary method may further include operating the first and second drive mechanisms in reverse to move the first and second moveable inserts away from the blow-molded bottle.

An eighth exemplary embodiment is a blow molded bottle with a deep pinch grip manufactured according to the method of the seventh exemplary embodiment. This bottle may be a 1.75 liter bottle with a deep pinch grip no more than about 2 and ⅛ inch wide and having a ledge at least about 29 millimeters deep on a first side of the grip and a ledge at least about 29 millimeters deep on a second side of the grip. Any of the bottles mentioned herein may desirably be a 1.75 liter liquor bottle.

We claim:

1. A mold with a cavity for forming a deep grip container, the mold comprising:
    a first mold pocket configured to receive a first moveable insert;
    a second mold pocket configured to receive a second moveable insert;
    a first drive mechanism fully contained within the mold and configured to drive the first moveable insert in a first direction through the first mold pocket into the cavity;
    a second drive mechanism fully contained within the mold and configured to drive the second moveable insert in a second direction through the second mold pocket into the cavity, the second direction being generally opposed to the first direction; and
    a cylinder shaft positioned in a cylinder shaft hole in the mold, the cylinder shaft in mechanical cooperation with the first drive mechanism.

2. The mold of claim 1, further comprising a linkage between the cylinder shaft and the first drive mechanism.

3. The mold of claim 2 further comprising: an angled roller slot in the mold, angled upward and outward in relation to the cavity; and
    a roller mounted to the linkage and adapted to roll in the roller slot.

4. The mold of claim 3 wherein the angled roller slot is a dog leg configuration with a straight portion of the slot located above an angled portion.

5. The mold of claim 1 further comprising a fluid pressure cylinder mounted to a bottom surface of the mold, wherein the cylinder shaft is configured to be operated by the fluid pressure cylinder.

6. The mold of claim 5 wherein the fluid pressure cylinder operates under hydraulic pressure.

7. The mold of claim 5 wherein the fluid pressure cylinder operates under pneumatic pressure.

8. The mold of claim 1 wherein the first drive mechanism is configured to drive the first moveable insert in the first direction at least one half inch into the cavity and the second drive mechanism is configured to drive the second moveable insert in the second direction at least one half inch into the cavity.

9. A method of manufacturing a blow molded bottle with a deep pinch grip comprising:
    providing a mold hanger having an outer envelope;
    providing in the mold hanger a mold with a cavity configured to receive molten plastic;
    providing within the outer envelope a first pocket configured to receive a first moveable insert;
    providing within the outer envelope a second pocket configured to receive a second moveable insert;
    providing within the outer envelope a first drive mechanism configured to drive the first moveable insert in a first direction through the first pocket into the cavity;
    providing within the outer envelope a second drive mechanism configured to drive the second moveable insert in a second direction through the second mold pocket into the cavity, the second direction being generally opposed to the first direction;
    providing within the outer envelope a cylinder shaft positioned in a cylinder shaft hole in the mold, the cylinder shaft in mechanical cooperation with the first drive mechanism;
    blowing molten plastic into contact with the mold; and
    after blowing the molten plastic into contact with the mold, operating the first and second drive mechanisms to drive the first and second moveable inserts into the cavity while the plastic is still pliable and form a blow-molded bottle with a deep pinch grip.

10. The method of claim 9 further comprising operating the first and second drive mechanisms in reverse to move the first and second moveable inserts away from the blow-molded bottle.

11. A mold with a cavity for forming a deep grip container, the mold comprising:
    a first mold pocket configured to receive a first moveable insert;
    a second mold pocket configured to receive a second moveable insert;
    a first drive mechanism fully contained within the mold and configured to drive the first moveable insert in a first direction through the first mold pocket into the cavity; and
    a second drive mechanism fully contained within the mold and configured to drive the second moveable insert in a second direction through the second mold pocket into the cavity, the second direction being generally opposed to the first direction,
    wherein the first drive mechanism comprises a slotted cam.

12. The mold of claim 11, further comprising:
    a cylinder shaft positioned in a cylinder shaft hole in the mold, the cylinder shaft in mechanical cooperation with the first drive mechanism; and
    a linkage between the cylinder shaft and the first drive mechanism.

13. The mold of claim 12 further comprising: an angled roller slot in the mold, angled upward and outward in relation to the cavity; and
    a roller mounted to the linkage and adapted to roll in the roller slot.

14. The mold of claim 13 wherein the angled roller slot is a dog leg configuration with a straight portion of the slot located above an angled portion.

15. The mold of claim 11 further comprising a cylinder shaft positioned in a cylinder shaft hole in the mold, the cylinder shaft in mechanical cooperation with the first drive mechanism; and
    a fluid pressure cylinder mounted to a bottom surface of the mold, wherein the cylinder shaft is configured to be operated by the fluid pressure cylinder.

16. The mold of claim 15 wherein the fluid pressure cylinder operates under hydraulic pressure.

17. The mold of claim 15 wherein the fluid pressure cylinder operates under pneumatic pressure.

18. The mold of claim 11 wherein the first drive mechanism is configured to drive the first moveable insert in the first direction at least one half inch into the cavity and the second drive mechanism is configured to drive the second moveable insert in the second direction at least one half inch into the cavity.

\* \* \* \* \*